United States Patent
Moon et al.

(10) Patent No.: US 7,256,154 B2
(45) Date of Patent: Aug. 14, 2007

(54) STRUCTURED CATALYST FOR POX REFORMING OF GASOLINE FOR FUEL-CELL POWERED VEHICLES APPLICATIONS AND A METHOD OF PREPARING THE SAME

(75) Inventors: Dong Ju Moon, Seoul (KR); Jong Woo Ryu, Seoul (KR); Dong Min Kang, Yeongiu-si (KR); Byung Gwon Lee, Seoul (KR); Byoung Sung Ahn, Seoul (KR); Sang Deuk Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 298 days.

(21) Appl. No.: 10/830,238

(22) Filed: Apr. 23, 2004

(65) Prior Publication Data

US 2005/0090392 A1    Apr. 28, 2005

(30) Foreign Application Priority Data

Oct. 25, 2003 (KR) ............... 10-2003-0074937

(51) Int. Cl.
*B01J 23/00* (2006.01)
*B01J 21/00* (2006.01)
*B01J 20/00* (2006.01)

(52) U.S. Cl. .......... 502/300; 502/305; 502/308; 502/313; 502/314; 502/315; 502/316; 502/326; 502/327; 502/335; 502/338; 502/349; 502/350; 502/351; 502/322; 502/320; 502/415; 502/439; 502/355; 502/254; 502/255; 502/256; 502/257; 502/258; 502/259; 502/260; 502/261; 502/262; 502/263; 502/240; 502/242; 502/527.19

(58) Field of Classification Search ............... 502/300, 502/305, 308, 309, 313–316, 326, 327, 335, 502/338, 349–351, 322, 320, 415, 439, 355, 502/254–263, 240, 242, 527.19
See application file for complete search history.

(56) References Cited

U.S. PATENT DOCUMENTS 3,554,929 A * 1/1971 Aarons .............. 502/178

(Continued)

FOREIGN PATENT DOCUMENTS

EP    0 977 293 A2    2/2000
KR    2002-21236     10/2003

OTHER PUBLICATIONS

Moon, D. J. et al., "Studies on gasoline fuel processor system for fuel-cell powered vehicles application" Applied Catalysis A: General 21, pp. 1-9., (2001).
Kang, D.M. et al., "Structured support/Preparation of structured support with high surface area by washcoating method", Applied Chemistry, vol. 7, No. 1, pp. 189-192, May 2003.

(Continued)

*Primary Examiner*—Cam N. Nguyen
(74) *Attorney, Agent, or Firm*—Finnegan, Henderson, Farabow, Garrett & Dunner, LLP

(57) ABSTRACT

The present invention relates to a structured catalyst for reforming of gasoline and a method of preparing the same, more particularly to a structured catalyst for reforming of gasoline for fuel-cell powered vehicles prepared by washcoating the transition metal based reforming catalyst on the surface of the ceramic honeycomb support wash-coated with sub-micron sized alumina or its precursor to sufficiently increase the effective surface area and the performance of the catalyst and a method of preparing the same.

4 Claims, 2 Drawing Sheets

U.S. PATENT DOCUMENTS

| | | | | |
|---|---|---|---|---|
| 3,809,743 | A * | 5/1974 | Upland et al. | 423/213.5 |
| 3,839,224 | A * | 10/1974 | Yonehara et al. | 502/66 |
| 3,840,471 | A * | 10/1974 | Acres | 502/177 |
| 3,908,047 | A * | 9/1975 | Beuther et al. | 427/282 |
| 4,072,471 | A | 2/1978 | Morgan, Jr. et al. | |
| 4,657,880 | A * | 4/1987 | Lachman et al. | 502/64 |
| 4,793,797 | A * | 12/1988 | Kato et al. | 431/7 |
| 5,063,193 | A * | 11/1991 | Bedford et al. | 502/304 |
| 5,145,825 | A | 9/1992 | Deeba et al. | |
| 5,346,722 | A * | 9/1994 | Beauseigneur et al. | 427/300 |
| 5,384,300 | A * | 1/1995 | Feeley et al. | 502/252 |
| 5,547,641 | A | 8/1996 | Smith et al. | |
| 6,110,862 | A * | 8/2000 | Chen et al. | 502/326 |
| 6,183,703 | B1 | 2/2001 | Hsu et al. | |
| 6,248,684 | B1 * | 6/2001 | Yavuz et al. | 502/66 |
| 6,274,107 | B1 * | 8/2001 | Yavuz et al. | 423/213.5 |
| 6,566,573 | B1 * | 5/2003 | Bharadwaj et al. | 585/658 |
| 6,596,249 | B2 * | 7/2003 | Lin et al. | 423/247 |
| 7,022,644 | B2 * | 4/2006 | Foong et al. | 502/303 |
| 7,022,646 | B2 * | 4/2006 | Li | 502/339 |
| 7,037,875 | B2 * | 5/2006 | Hu et al. | 502/304 |
| 2002/0039964 | A1 * | 4/2002 | Tanaka et al. | 502/304 |
| 2003/0021745 | A1 * | 1/2003 | Chen | 423/239.1 |
| 2003/0100447 | A1 * | 5/2003 | Deeba et al. | 502/339 |
| 2003/0158037 | A1 * | 8/2003 | Foong et al. | 502/328 |
| 2003/0191020 | A1 * | 10/2003 | Bharadwaj et al. | 502/334 |
| 2004/0092395 | A1 * | 5/2004 | Hase et al. | 502/439 |

OTHER PUBLICATIONS

Ryu, J.W. et al., "Structured Catalyst/Development of Gasoline Reformer for Fuel-Cell Powered Vehicles: POX Reforming of Gasoline over Structured Catalyst", Theories and Applications of Chem. Eng., vol. 9., No. 1, pp. 1142-1145, (2003).

Kang, D.M., et al., "Alumina fine-grinding Structured Catalyst/Development of Gasoline Fuel Processor for Fuel Cell Vehicles Fine-grinding characteristics of alumina and development of Structured catalyst", Theories and Applications of Chem. Eng., vol. 9., No. 1, pp. 1208-1211 (2003).

* cited by examiner

STRUCTURED CATALYST FOR POX REFORMING OF GASOLINE FOR FUEL-CELL POWERED VEHICLES APPLICATIONS AND A METHOD OF PREPARING THE SAME

BACKGROUND OF THE INVENTION

1. Field of the Invention

The present invention relates to a structured catalyst for reforming of gasoline and a method of preparing the same, more particularly to a structured catalyst for reforming of gasoline for fuel-cell powered vehicles prepared by wash-coating the transition metal based reforming catalyst on the surface of the ceramic honeycomb support wash-coated with sub-micron sized alumina or its precursor to sufficiently increase the effective surface area and the performance of the catalyst and a method of preparing the same.

2. Description of Related Art

Researches on fuel processors for fuel-cell powered vehicles are currently on the active progress worldwide. There are many challenges, such as lightweightness, compactness, durability, dynamic load, thermal balance control, CO concentration control and startup time, in developing a fuel processor for a fuel-cell powered vehicle. Especially, a compact system is essential to develop an on-board gasoline fuel processor.

A gasoline fuel processor mounted on a fuel-cell powered vehicle comprises a desulfurizer, an autothermal reformer (ATR), a water gas shift (WGS) reactor, a preferential partial oxidation (PROX) reactor, system equipments and controllers. For commercialization of a fuel processor, development of a structured catalyst capable of maintaining catalytic activity is necessary along with development of a catalyst having superior performance for each reaction.

Structured catalysts are used in various fields including vehicles exhaust gas purifying catalysts, as environmental regulations on the air become more strict. Especially, they are used to convert nitrogen oxides generated in combustion facilities, such as power plants, incinerators and engines of ships, by selective catalytic reduction (SCR), to adsorb a variety of noxious gases generated during semiconductor-manufacturing processes and to remove a variety of volatile organic compounds (VOCs).

As a support of structured catalyst, the monolithic type modules are most favored. For example, they are easily found in the reactors for removing such impurities as hydrocarbons, NOx and VOCs from exhaust gases and the honeycomb type reactors for treating vehicle exhaust gases. The honeycomb type reactors are extrusion-molded to have honeycomb-shaped cross-sectional paths. They are used widely because of relatively large surface area per unit volume. A support with large surface area and/or a catalyst are impregnated on the basic monolithic type module having regular paths parallel to the direction of gas flow by wash-coating method.

Since the introduction in the early 1970s the honeycomb type reactors have been widely used. U.S. Pat. Nos. 4,072,471, 5,547,641 and 5,145,825 disclose honeycomb reactors, reaction processes thereof, optimization of catalytic materials and preparing methods thereof.

However, most of the preceding researches focus on honeycomb reactors for removing such impurities as hydrocarbons, NOx and VOCs from vehicle exhaust gases, and there have been few researches on gasoline reforming structured catalysts for fuel-cell powered vehicles.

In recent years, researches on processing reactions for fuel-cell powered vehicles have been reported in Korean Pat. Application No. 2002-21236, U.S. Pat. No. 6,183,703 and European Pat. No. 977,293. They are about heat supply method suitable for fuel reaction equipments, catalytic system array for each reaction process (POX, WGS, de-Sulfur, PROX and so forth), fuel injection method and fuel injection line system and catalyst filling layer.

Most of the preceding researches are performed using powder type or pellet type catalysts, which increases reactor volume and pressure when applied to the kW level. Therefore, a structured catalyst having good thermal stability and mechanical strength while capable of reducing reactor pressure is highly needed.

SUMMARY OF THE INVENTION

It is an object of the present invention to provide a structured catalyst for kW-level gasoline POX reforming in order to develop a gasoline fuel processor integrated with a polymer electrode membrane (PEM) fuel cell.

It is another object of the present invention to provide a method of preparing a structured catalyst with significantly improved POX reforming catalytic activity comprising the steps of: preparing a support with large surface area by wash-coating sub-micron sized alumina on a ceramic honeycomb support; and supporting transition metal catalyst powder by wash-coating.

DETAILED DESCRIPTION OF THE PREFERRED EMBODIMENTS

Figure 1:
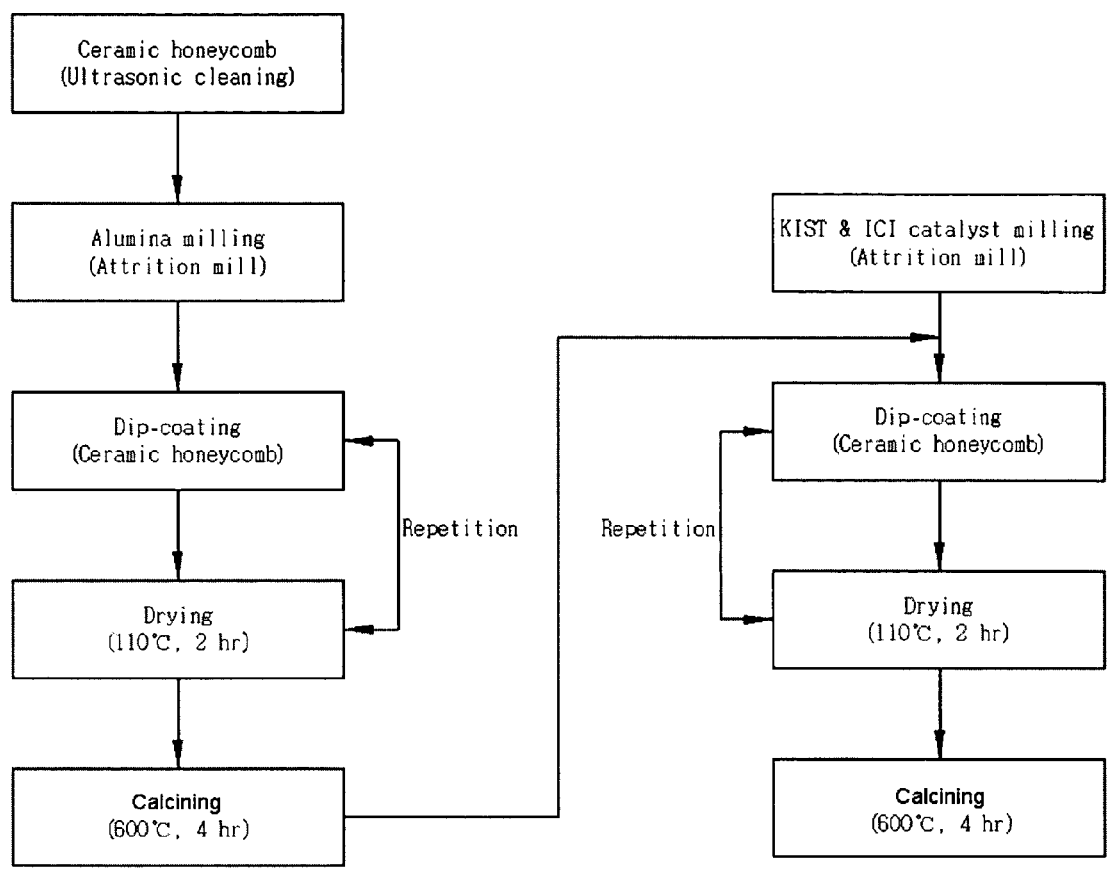
FIG. 1 is a schematic diagram showing the method of preparing a structured catalyst for reforming of gasoline of the present invention.

The present invention relates to a structured catalyst for reforming of gasoline for fuel-cell powered vehicles comprising a gasoline reforming transition metal catalyst supported on a ceramic honeycomb support wash-coated with sub-micron sized alumina, the support having a BET surface area ranging from 20 to 60 $m^2/g$, more preferably from 30 to 60 $m^2/g$.

The present invention also relates to a method of preparing a structured catalyst for reforming of gasoline comprising the steps of: 1) preparing an aqueous alumina solution with a pH 2 to 5; 2) adding 2 to 7 wt % of polyvinyl alcohol, 3 to 7 wt % of methyl cellulose and 1 to 5 wt % of phosphoric acid ($H_3PO_4$) based on 100 wt % of the solid content of the aqueous alumina solution, stirring and ball-milling it to prepare an alumina slurry; 3) coating the alumina slurry on a ceramic honeycomb support; 4) ball-milling of gasoline reforming transition metal catalyst powder to prepare a catalyst slurry; and 5) wash-coating the catalyst slurry to prepare a structured catalyst.

The present invention is further relates to a method of preparing a synthetic gas containing hydrogen and carbon monoxide from autothermal reforming reaction of gasoline, the reforming reaction performed under a reaction temperature ranging from 600 to 1000° C., space velocity ranging from 1,000 to 50,000 $hr^{-1}$ and molar ratios of $H_2O/C$ and O/C ranging from 0.1 to 5 and 0.1 to 3 respectively in the presence of the structured catalyst of the present invention.

Hereinafter, the present invention is described in more detail.

The present invention relates to a method of preparing a structured catalyst by supporting gasoline reforming transition metal catalyst powder, which is known to generate a synthetic gas containing hydrogen ($H_2$) and carbon monoxide (CO) in POX reforming of iso-octane, on a ceramic honeycomb support by wash-coating to offer better catalytic activity and superior adhesivity.

As the gasoline reforming transition metal catalyst powder, any one that has catalytic activity in POX reforming reaction of iso-octane can be used. The present invention relates to a structured catalyst prepared by supporting the above-mentioned catalyst powder along with a suitable binder composition on a ceramic honeycomb support with large surface area, on which alumina or its precursor is wash-coated, by Wash-coating. A structured catalyst having good catalytic activity and superior adhesivity is obtained through control of particle size and pH, selection of binder, number of impregnations and concentration of impregnation solution.

Examples of the gasoline reforming transition metal catalyst used in the present invention are ICI catalyst; which is commercially available, and porous supported transition metal catalyst powder; which was developed by the present inventors and filed for the patent application, Korean Pat. Application No. 2002-21236.

The catalyst disclosed in Korean Pat. Application No. 2002-21236 comprises 5 to 15 wt % of magnesium (Mg), as a metal preventing carbon deposition, with reference to the amount of the total catalyst and at least two transition metals as promoters selected from the group consisting of Ni, Co, Fe, Mo, Cr, Ti and Zr supported on a porous support such as γ-alumina and silica-alumina (Si—Al). With reference to the amount of the total catalyst, Ni may be comprised in 0.1 to 15 wt %, Co in 0.1 to 15 wt %, Fe in 2 to 15 wt %, Mo in 2 to 15 wt %, Cr in 0.1 to 1.0 wt %, Ti in 0 to 0.005 wt % and Zr in 0 to 0.005 wt %.

FIG. 1 is a schematic diagram showing the method of preparing a structured catalyst for reforming of gasoline for fuel-cell powered vehicles of the present invention. The method of preparing the structured catalyst is described in detail referring to FIG. 1.

The first step is preparation of a pH 2 to 5 aqueous alumina solution.

Sub-micron sized γ-alumina or boehmite alumina having a particle size ranging from 0.5 to 0.95 μm is dissolved in diluted water to prepare a 30 to 45 wt % aqueous solution. Then, the pH is adjusted to 2 to 5 using an aqueous hydrochloric acid solution as a dispersant.

The second step is preparation of an alumina slurry by adding a binder to the aqueous alumina solution.

The binder is added to the aqueous alumina solution to prepare a structured catalyst slurry having superior adhesivity. The adhesivity may be changed by selection of binder composition and its content control. In the present invention, 2 to 7 wt % of polyvinyl alcohol, 3 to 7 wt % of methyl cellulose and 1 to 5 wt % of phosphoric acid ($H_3PO_4$) are added to the aqueous alumina solution for 100 wt % of solid content. Then, the mixture is strongly stirred for 1 to 3 hr and zirconia balls having a diameter ranging from 1 to 5 mm is wet-milled to prepare a wash-coating slurry. It is important to control the concentration of the alumina slurry to 35 to 45 wt % to obtain wanted alumina wash-coating amount and BET surface area of the support.

The third step is coating of the alumina slurry on a ceramic honeycomb support.

A ceramic honeycomb is washed several times with diluted water using an ultrasonic cleaner to remove remaining impurities, and then dried in a constant temperature/humidity chamber. Then, the alumina slurry prepared above is coated on the ceramic honeycomb. The coated ceramic honeycomb is blown with blowing air to remove excess slurry. The Wash-coating may be a single coating or multi coating of 2 to 5 layers, if required. After wash-coating, the ceramic honeycomb is dried in a constant temperature/humidity chamber of 60 to 110° C. and 70 to 90% relative humidity (RH), and then calcined at 500 to 700° C. in air. The resultant honeycomb support wash-coated with alumina has a BET surface area ranging from 20 to 60 $m^2/g$.

The fourth step is drying of catalyst slurry.

A catalyst slurry is prepared similarly to the process of alumina slurry preparation using an attrition mill. The binder used in the preparation of alumina slurry may be added to improve adhesivity. That is, 0 to 7 wt % of polyvinyl alcohol, 0 to 7 wt % of methyl cellulose and 0 to 5 wt % of phosphoric acid ($H_3PO_4$) are added to 100 wt % of the transition metal catalyst powder as binder, and the mixture is stirred and ball-milled to prepare a catalyst slurry.

The fifth step is preparation of the structured catalyst of the present invention by wash-coating the catalyst slurry on the alumina wash-coated support.

The catalyst slurry coating may be a single coating or multi coating of 2 to 5 layers, if required. The honeycomb support is dried in a constant temperature/humidity chamber of 60 to 110° C. and 70 to 90% relative humidity, and then calcined at 500 to 700° C. in air.

Such prepared structured catalyst showed high catalytic activity when applied to ATR reaction of gasoline for fuel-cell powered vehicles. The optimum reaction condition to confirm the catalytic activity is: reaction temperature=600 to 1,000° C.; space velocity=1,000 to 50,000 $hr^{-1}$, molar ratio of $H_2O/C$=0.1 to 5 and molar ratio of O/C=0.1 to 3. When the ATR reaction was performed under the above-mentioned condition, a synthetic gas containing hydrogen and carbon monoxide was prepared with minimum carbon deposition and maximum resistance against sulfur.

The hydrogen gas reformed by the ATR reaction may be passed through a series of high temperature water gas shift (HTS) reactor, low temperature water gas shift (LTS) reactor and/or preferential partial oxidation (PROX) reactor to reduce the CO concentration, and then provided to a polymer electrolyte membrane (PEM) fuel cell for a fuel-cell powered vehicle.

The structured catalyst of the present invention may also be utilized in gas stations to manufacture highly pure hydrogen gases or petrochemical processes to manufacture synthetic gases.

EXAMPLES

Hereinafter, the present invention is described in more detail through Examples. However, the following Examples are only for the understanding of the present invention, and they should not be construed as limiting the scope of the present invention.

Example 1

Preparation of Ceramic Honeycomb Support Wash-coated with Alumina

Example 1-A

Honeycomb Support Wash-coated with γ-Alumina

Figure 2:
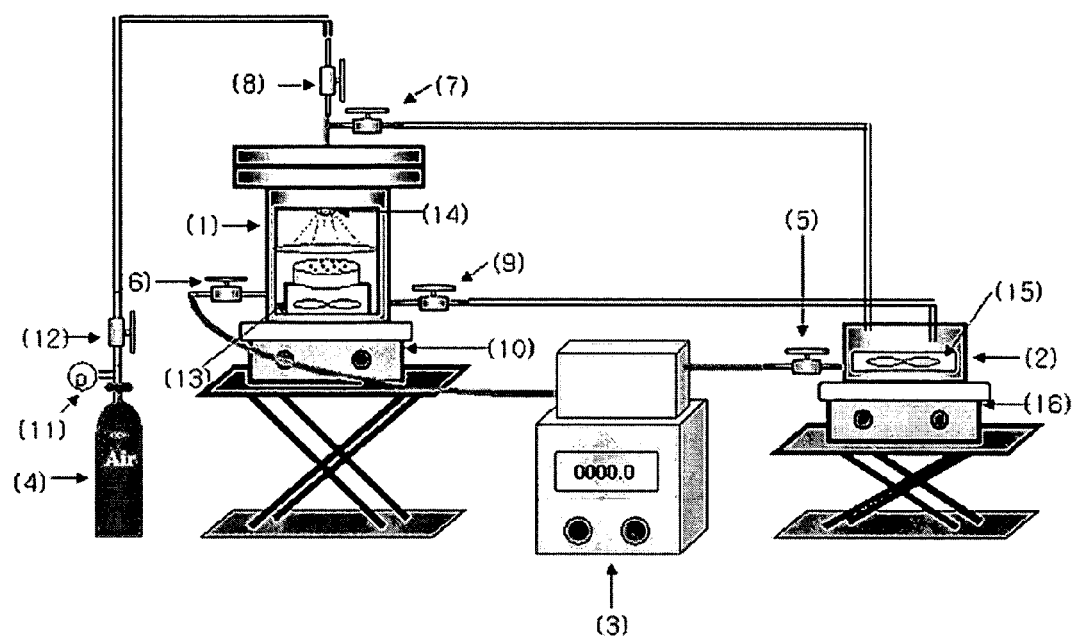
FIG. 2 is a schematic diagram of the Wash-coating system for preparing the gasoline reforming structured catalyst of the present invention.

The Wash-coating system is shown in FIG. 2. It comprises a reactor that wash-coats the ceramic honeycomb, an air blower that removes excess slurry, a storage tank that stores and stirs the wash-coating slurry and a liquid pump that circulates the slurry.

For the ceramic honeycomb, products of NGK (Japan) having a diameter of 86 mm, length of 25 mm and number of cells per unit area of 400, 600 and 900 cell/in$^2$ were used. The ceramic honeycomb was washed with diluted water for several times using an ultrasonic cleaner before Wash-coating to remove impurities remaining in the support. Then, it was dried in a constant temperature/humidity chamber of 80° C. for 48 hr. γ-Alumina having an average particle size of about 1.487 μm was used as a support. γ-Alumina was mixed with diluted water (30 to 45 wt %). A binder comprising 5 wt % of polyvinyl alcohol (PVA), 5 wt % of methyl cellulose and 2 wt % of phosphoric acid ($H_3PO_4$) was added to improve adhesivity. Then, hydrochloric acid was loaded to stabilize the mixture. The mixture was strongly stirred for 2 hr. Zirconia balls having a diameter of 1.00 mm, 3.00 mm and 5.00 mm were loaded to an attrition mill to 50 to 80% of capacity. The impeller rotating speed was 200 rpm, 400 rpm and 650 rpm. The alumina milling time was 10 hr.

Wash-coating was performed using the dip coater shown in FIG. 2. The ceramic honeycomb (400 cells/in$^2$, BET surface area=2.4 m$^2$/g) was put in the wash-coating reactor 1 and the wash-coating slurry prepared above was put in the storage tank 2. Dip coating was performed for 10 minutes while circulating the wash-coating slurry using the liquid pump 3. Excess slurry was removed with the air blower 4, and the ceramic honeycomb was dried in a constant temperature/humidity chamber of 110° C. and 85% relative humidity for 2 hr and then calcined at 600° C. for 4 hr. The wash-coating slurry was wash-coated on the ceramic honeycomb by single, double and triple coatings. The γ-alumina coating amount was about 10 to 56% of the honeycomb support weight. The BET surface area increased from 2.4 m$^2$/g up to 20 to 60 m$^2$/g. The following Table 1 shows alumina coating amount and BET surface area for a variety of reaction conditions.

TABLE 1

| Ball-milling condition* | | | | |
|---|---|---|---|---|
| Slurry concentration | Ball size (mm) | Slurry particle size (μm) | Number of γ-alumina coatings | Alumina coating amount (%) | BET surface area (m$^2$/g) |
| γ-Alumina (30 wt %) | 1 | 0.21 | 2 | 15 | 23.6 |
| | | | 3 | 30 | 31.5 |
| | 3 | 0.35 | 3 | 36 | 21.5 |
| γ-Alumina (35 wt %) | 1 | 0.42 | 1 | 12 | 29.6 |
| | | | 2 | 18 | 40.2 |
| | | | 3 | 34 | 45.6 |
| | 3 | 0.54 | 1 | 18 | 22.6 |
| | | | 2 | 26 | 28.3 |
| | | | 3 | 41 | 35.2 |
| | 5 | 1.16 | 2 | 33 | 21.8 |
| | | | 3 | 48 | 29.5 |
| γ-Alumina (40 wt %) | 1 | 0.50 | 1 | 17 | 32.1 |
| | | | 2 | 23 | 38.4 |
| | | | 3 | 38 | 45.2 |
| | 3 | 0.74 | 1 | 21 | 28.3 |
| | | | 2 | 35 | 33.2 |
| | | | 3 | 43 | 38.4 |
| | 5 | 1.23 | 1 | 25 | 26.1 |
| | | | 2 | 38 | 30.8 |
| | | | 3 | 49 | 36.8 |
| γ-Alumina (45 wt %) | 1 | 0.72 | 1 | 29 | 31.0 |
| | | | 2 | 42 | 33.4 |
| | | | 3 | 56 | 29.5 |
| | 3 | 1.16 | 1 | 32 | 26.3 |
| | | | 2 | 47 | 33.1 |
| | 5 | 1.35 | 1 | 30 | 24.2 |
| | | | 2 | 50 | 23.4 |

*Attrition mill operating condition: Impeller rotating speed = 650 rpm. Ceramic honeycomb support: NGK Co., Japan, cell density = 400 cells/in$^2$.

Example 1-B

Honeycomb Support Wash-coated with Boehmite Alumina

A wash-coated honeycomb support was prepared as in Example 1-A using boehmite alumina instead of γ-alumina. The boehmite alumina coating amount was up to 10 to 53% of the honeycomb support weight. The BET surface area increased from 2.4 m$^2$/g up to 30 to 60 m$^2$/g. The following Table 2 shows alumina coating amount and BET surface area for a variety of reaction conditions.

TABLE 2

| Ball-milling condition* | | | | |
|---|---|---|---|---|
| Slurry concentration | Ball size (mm) | Slurry particle size (μm) | Number of boehmite coatings | Alumina coating amount (%) | BET surface area (m$^2$/g) |
| Boehmite (30 wt %) | 1 | 0.18 | 1 | 9 | 31.2 |
| | | | 2 | 13 | 35.6 |
| | | | 3 | 26 | 40.4 |
| | 3 | 0.30 | 1 | 12 | 28.6 |
| | | | 2 | 18 | 33.4 |
| | | | 3 | 35 | 38.5 |
| | 5 | 0.95 | 1 | 14 | 22.6 |
| | | | 2 | 20 | 26.3 |
| | | | 3 | 36 | 29.4 |
| Boehmite (35 wt %) | 1 | 0.36 | 1 | 12 | 35.7 |
| | | | 2 | 19 | 43.8 |
| | | | 3 | 30 | 51.6 |
| | 3 | 0.49 | 1 | 17 | 32.1 |
| | | | 2 | 26 | 40.3 |
| | | | 3 | 38 | 43.5 |
| | 5 | 1.05 | 1 | 20 | 28.6 |
| | | | 2 | 31 | 35.1 |
| | | | 3 | 45 | 40.2 |
| Boehmite (40 wt %) | 1 | 0.46 | 1 | 15 | 42.6 |
| | | | 2 | 20 | 51.2 |
| | | | 3 | 35 | 60.0 |
| | 3 | 0.69 | 1 | 21 | 34.8 |
| | | | 2 | 35 | 43.8 |
| | | | 3 | 40 | 50.2 |
| | 5 | 1.12 | 1 | 24 | 30.4 |
| | | | 2 | 36 | 38.5 |
| | | | 3 | 45 | 45.0 |
| Boehmite (45 wt %) | 1 | 0.65 | 1 | 25 | 33.1 |
| | | | 2 | 38 | 40.5 |
| | | | 3 | 53 | 38.6 |
| | 3 | 1.01 | 1 | 30 | 30.5 |
| | | | 2 | 44 | 33.1 |
| | 5 | 1.25 | 1 | 30 | 29.4 |
| | | | 2 | 50 | 30.1 |

*Attrition mill operating condition: Impeller rotating speed = 650 rpm. Ceramic honeycomb support: NGK Co., Japan, cell density = 400 cells/in$^2$.

As seen in Table 1 and Table 2, when the honeycomb supports were coated at a slurry concentration ranging from 35 to 45 wt %, the coating amount of alumina and the resultant BET surface area were increased. And, boehmite alumina showed higher coating amount and BET surface area than γ-alumina.

Example 2

Preparation of Structured Catalyst

Gasoline reforming transition metal catalyst powder was supported on the honeycomb support of high surface area wash-coated with γ-alumina or boehmite to prepare a structured catalyst.

Example 2A

Structured ICI Catalyst

A pellet type ICI catalyst (Imperial Chemical Industrial, England) was mixed with diluted water to prepare a 20 wt % solution to obtain uniform catalyst particle distribution for wash-coating. The mixture was stabilized (pH 3) with hydrochloric acid and strongly stirred for 2 hr. Zirconia balls having a diameter of 1.00 mm, 3.00 mm and 5.00 mm were loaded to an attrition mill to 70 to 80% of capacity. The impeller rotating speed was 200 rpm, 400 rpm and 650 rpm. The ICI catalyst milling time was 10 hr. The resultant wash-coated slurry was coated on a ceramic honeycomb, a catalyst support.

The catalyst slurry was a supported on the alumina wash-coated ceramic honeycomb using the dip coater shown in FIG. 2. Excess slurry was removed with the air blower, and the ceramic honeycomb was dried in a constant temperature/humidity chamber of 110° C. and 85% relative humidity for 2 hr and then calcined at 600° C. for 4 hr. The wash-coating slurry was wash-coated on the ceramic honeycomb by single, double and triple coatings. ICI catalyst was coated directly without alumina coating (Comparative Example 1). The following Table 3 shows ICI catalyst supporting amount and BET surface area for a variety of reaction conditions.

TABLE 3

| Structured ICI catalyst | Honeycomb support | | Number of ICI coatings | Catalyst supporting amount (%) | BET surface area (m$^2$/g) |
|---|---|---|---|---|---|
| | Slurry concentration | Number of coatings | | | |
| A35ICI 2-1 | γ-Alumina | 2 | 1 | 23 | 27.3 |
| A35ICI 2-2 | (35 wt %) | 2 | 2 | 30 | 24.5 |
| A35ICI 3-1 | | 3 | 1 | 37 | 32.1 |
| A35ICI 3-2 | | 3 | 2 | 44 | 26.4 |
| A35ICI 3-3 | | 3 | 3 | 53 | 23.7 |
| Comparative Example 1* | | 0 | 3 | 22 | 7.8 |
| A40ICI 3-1 | γ-Alumina | 3 | 1 | 43 | 30.1 |
| A40ICI 3-2 | (40 wt %) | 3 | 2 | 51 | 26.3 |
| A40ICI 3-3 | | 3 | 3 | 60 | 22.5 |
| B35ICI 1-1 | Boehmite | 1 | 1 | 15 | 21.7 |
| B35ICI 2-1 | (35 wt %) | 2 | 1 | 21 | 29.3 |
| B35ICI 2-2 | | 2 | 2 | 34 | 24.9 |
| B35ICI 2-3 | | 2 | 3 | 45 | 20.4 |
| B35ICI 3-1 | | 3 | 1 | 34 | 38.2 |
| B35ICI 3-2 | | 3 | 2 | 41 | 34.6 |
| B35ICI 3-3 | | 3 | 3 | 51 | 29.3 |
| B40ICI 1-1 | Boehmite | 1 | 1 | 21 | 28.4 |
| B40ICI 1-2 | (40 wt %) | 1 | 2 | 26 | 25.3 |
| B40ICI 1-3 | | 1 | 3 | 39 | 20.6 |
| B40ICI 2-1 | | 2 | 1 | 26 | 37.4 |
| B40ICI 2-2 | | 2 | 2 | 36 | 34.3 |
| B40ICI 2-3 | | 2 | 3 | 47 | 30.8 |
| B40ICI 3-1 | | 3 | 1 | 41 | 46.3 |
| B40ICI 3-2 | | 3 | 2 | 49 | 42.9 |
| B40ICI 3-3 | | 3 | 3 | 58 | 34.3 |

Attrition mill operating condition: Impeller rotating speed = 650 rpm; ball size = 1 mm.
Ceramic honeycomb support: NGK Co., Japan, cell density = 400 cells/in$^2$.
Comparative Example 1*: Directly coating ICI catalyst on honeycomb.

Example 2B

Structured KIST Catalyst

A structured KIST catalyst was prepared as in Example 2A using gasoline reforming transition metal catalyst comprising 11.76% of Ni, 2.94% of Fe, 11.5% of Mg, 31.5% of Al and less than 0.005% of Ti and Zr as disclosed in Example 3 of Korean Pat. Application No. 2002-21236. KIST catalyst was coated directly without alumina coating (Comparative Example 2). The following Table 4 shows KIST catalyst supporting amount and BET surface area for a variety of reaction conditions.

TABLE 4

| Structured ICI catalyst | Honeycomb support | | Number of coatings | Number of ICI catalyst coatings | Catalyst supporting amount (%) | BET surface area (m$^2$/g) |
|---|---|---|---|---|---|---|
| | Slurry concentration | | | | | |
| A35KIST 2-1 | γ-Alumina | | 2 | 1 | 25 | 26.5 |
| A35KIST 2-2 | (35 wt %) | | 2 | 2 | 32 | 25.5 |
| A35KIST 3-1 | | | 3 | 1 | 39 | 33.4 |
| A35KIST 3-2 | | | 3 | 2 | 45 | 28.4 |
| A35KIST 3-3 | | | 3 | 3 | 55 | 23.9 |
| Comparative Example 2* | | | 0 | 3 | 25 | 8.1 |
| A40KIST 2-1 | γ-Alumina | | 2 | 1 | 28 | 23.8 |
| A40KIST 3-1 | (40 wt %) | | 3 | 1 | 44 | 31.4 |
| A40KIST 3-2 | | | 3 | 2 | 54 | 23.2 |
| A40KIST 3-3 | | | 3 | 3 | 62 | 23.5 |
| B35KIST 1-1 | Boehmite | | 1 | 1 | 17 | 22.1 |
| B35KIST 2-1 | (35 wt %) | | 2 | 1 | 24 | 29.4 |
| B35KIST 2-2 | | | 2 | 2 | 36 | 23.8 |
| B35KIST 2-3 | | | 2 | 3 | 47 | 20.7 |
| B35KIST 3-1 | | | 3 | 1 | 36 | 37.2 |
| B35KIST 3-2 | | | 3 | 2 | 44 | 35.1 |
| B35KIST 3-3 | | | 3 | 3 | 53 | 28.9 |
| B40KIST 1-1 | Boehmite | | 1 | 1 | 23 | 27.5 |
| B40KIST 1-2 | (40 wt %) | | 1 | 2 | 29 | 25.8 |
| B40KIST 1-3 | | | 1 | 3 | 41 | 21.4 |
| B40KIST 2-1 | | | 2 | 1 | 27 | 38.1 |
| B40KIST 2-2 | | | 2 | 2 | 40 | 34.5 |
| B40KIST 2-3 | | | 2 | 3 | 50 | 31.3 |
| B40KIST 3-1 | | | 3 | 1 | 43 | 44.7 |
| B40KIST 3-2 | | | 3 | 2 | 51 | 42.4 |
| B40KIST 3-3 | | | 3 | 3 | 63 | 37.3 |

Attrition mill operating condition: Impeller rotating speed = 650 rpm; ball size = 1 mm.
Ceramic honeycomb support: NGK Co., Japan, cell density = 400 cells/in$^2$.
Comparative Example 2*: Directly coating KIST catalyst on honeycomb.

As seen in Table 3 and Table 4, when KIST catalyst (or ICI catalyst) was directly coated without sub-micron sized alumina coating (Comparative Examples 1 and 2), the resulting surface area was relatively small. Therefore, such catalysts are expected to have much lower catalytic activity than the catalyst of the present invention.

Test Examples

ATR reaction was performed as follows to test gasoline reforming.

The optimum reaction condition to test catalyst characteristics reported by Moon, et al., the present inventors, was used [D. J. Moon, K. Sreekumar, S. D. Lee, B. J. Lee, H. S. Kim, *Appl. Catal. A: General*, 215 (2001) 1].

Particularly, iso-octane, the representative material of gasoline, was used as fuel of the gasoline reforming reaction.

The ATR reaction was performed with the conventional fixed bed reactor comprising a reactant feeder, evaporator, POX reformer, water trap and on-line gas chromatograph (GC). Gaseous reactants such as hydrogen, nitrogen and air were pretreated and then fed to the reactor using a mass flow controller. Liquid reactants such as iso-octane and water were supplied to the evaporator at 0.003 to 0.3 ml/min and 0.007 to 0.6 ml/min respectively using a liquid delivery pump (model M930, Young Lin Co., Korea) after preheating to 350° C. The evaporator and POX reformer were made by Inconel-600 tubes (outer diameter=$1.25\times10^{-2}$ m, inner diameter=$9.5\times10^{-3}$ m, and length=$2\times10^{-1}$ m). Reaction temperature was measured by mounting a chromel-alumel thermocouple at the inlet and outlet of the catalyst bed. A PID temperature controller was used to control the temperature change during reaction within ±1° C. All lines were heated to over 150° C., so that moisture contained in reaction products does not condensate. Temperature of each line was measured by a thermocouple and recorded.

Test Example 1

POX Reforming Activity of KIST Catalyst

Iso-octane POX reforming reaction was performed using the structured KIST catalyst prepared in Example 2. The structured catalyst was loaded in a kW-level gasoline reformer. Iso-octane POX reforming was performed in the presence of the structured catalyst under the condition of: temperature=500 to 800° C., space velocity=1,000 hr$^{-1}$ and molar ratios of reactants: $H_2O/C=3$ and $O/C=1$. The gaseous reaction product was analyzed by an on-line gas chromatograph (TCD, HP 6890) after removing moisture at the water trap. A carbosphere column (10"×⅛" SS, 80/100 meshes) was used for analysis. Constituents of the reaction product were identified by GC mass spectroscopy (HP 5890 GC, 5971A MSD).

The iso-octane POX reforming reaction result is shown in the following Table 5.

TABLE 5

| POX reforming | Product distribution (mol %) | | | |
|---|---|---|---|---|
| catalyst | $H_2$ | CO | $CO_2$ | $CH_4$ |
| B40KIST 1-1 | 48.07 | 35.96 | 10.73 | 5.24 |
| B40KIST 1-2 | 49.04 | 34.23 | 11.32 | 5.41 |
| B40KIST 1-3 | 52.22 | 30.60 | 12.05 | 5.13 |
| B40KIST 2-1 | 54.78 | 27.75 | 11.24 | 6.23 |
| B40KIST 2-2 | 57.03 | 24.14 | 12.44 | 6.39 |
| B40KIST 2-3 | 56.07 | 25.92 | 12.28 | 5.73 |
| B40KIST 3-1 | 55.20 | 26.82 | 12.44 | 5.54 |

TABLE 5-continued

| POX reforming | Product distribution (mol %) | | | |
|---|---|---|---|---|
| catalyst | $H_2$ | CO | $CO_2$ | $CH_4$ |
| B40KIST 3-2 | 59.64 | 21.84 | 11.91 | 6.61 |
| B40KIST 3-3 | 57.77 | 23.75 | 10.76 | 7.72 |
| A40KIST 3-1 | 50.32 | 32.15 | 11.28 | 6.25 |
| A40KIST 3-2 | 53.57 | 29.36 | 11.06 | 6.01 |
| A40KIST 3-3 | 52.62 | 30.14 | 11.02 | 6.22 |
| Comparative Example 3* | 45.05 | 35.82 | 10.71 | 8.42 |

Comparative Example 3*: KIST catalyst (Korean Pat. Application No. 2002-21236) directly coated on honeycomb.
Iso-octane POX reforming condition: Reaction temperature = 750° C.; space velocity = 1,000 hr$^{-1}$; molar ratios: $H_2O/C = 3$ and $O/C = 1$; cell density = 400 cells/in$^2$.

The structured catalyst of the present invention which was prepared by supporting catalyst powder on the honeycomb support wash-coated sub-micron sized alumina showed significantly improved POX reforming characteristics compared with the KIST catalyst directly coated without alumina coating (Comparative Example 3), as seen in Table 5.

Test Example 2

Activity of Structured ICI Catalyst in POX Reforming Reaction

Iso-octane POX reforming reaction was performed as in Test Example 1 using the structured ICI catalyst prepared in Example 2.

The result is shown in the following Table 6.

TABLE 6

| POX reforming | Product distribution (mol %) | | | |
|---|---|---|---|---|
| catalyst | $H_2$ | CO | $CO_2$ | $CH_4$ |
| B40ICI 1-1 | 47.02 | 35.82 | 10.25 | 6.91 |
| B40ICI 1-2 | 48.00 | 34.21 | 10.21 | 7.58 |
| B40ICI 1-3 | 51.44 | 31.45 | 10.62 | 6.49 |
| B40ICI 2-1 | 53.45 | 28.59 | 10.53 | 7.43 |
| B40ICI 2-2 | 57.21 | 24.14 | 11.11 | 7.54 |
| B40ICI 2-3 | 55.06 | 26.62 | 11.03 | 7.29 |
| B40ICI 3-1 | 54.35 | 28.21 | 10.46 | 6.98 |
| B40ICI 3-2 | 57.65 | 23.21 | 11.12 | 8.02 |
| B40ICI 3-3 | 56.00 | 25.89 | 9.85 | 8.26 |
| A40ICI 3-1 | 49.15 | 33.42 | 11.09 | 6.44 |
| A40ICI 3-2 | 52.68 | 30.42 | 11.25 | 5.65 |
| A40ICI 3-3 | 51.34 | 31.23 | 10.40 | 7.03 |
| Comparative Example 4* | 46.10 | 34.92 | 10.23 | 8.75 |

Comparative Example 4*: ICI catalyst (Imperial Chemical Industrial, England) directly coated on honeycomb.
Iso-octane POX reforming condition: Reaction temperature = 750° C.; space velocity = 1,000 hr$^{-1}$; molar ratios: $H_2O/C = 3$ and $O/C = 1$; cell density = 400 cells/in$^2$.

The structured catalyst of the present invention which was prepared by supporting catalyst powder on the honeycomb support wash-coated sub-micron sized alumina showed significantly improved POX reforming characteristics compared with the ICI catalyst directly coated without alumina coating (Comparative Example 4), as seen in Table 6.

As described above, the structured catalyst of the present invention, which is prepared by supporting catalyst powder having gasoline POX reforming activity on the ceramic honeycomb support wash-coated with sub-micron sized alumina, shows significantly improved catalyst characteristics than the KIST catalyst and ICI catalyst prepared by direct coating without coating sub-micron sized alumina catalyst (Comparative Example 3 and Comparative Example 4).

Accordingly, the structured catalyst of the present invention is very useful as a gasoline reforming catalyst for fuel-cell powered vehicles.

Also, the structured catalyst of the present invention can be applied to gas stations for manufacturing high-purity hydrogens or petrochemical processes for manufacturing synthetic gases.

And, the hydrogen reformed by the ATR reaction may be passed through a series of high temperature water gas shift (HTS) reactor, low temperature water gas shift (LTS) reactor and/or preferential partial oxidation (PROX) reactor to reduce the CO concentration, and then provided to a polymer electrolyte membrane (PEM) fuel cell for a fuel-cell powered vehicle.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A structured catalyst for reforming of gasoline comprising a gasoline reforming transition metal catalyst supported on a ceramic honeycomb support wash-coated with γ-alumina or boehmite alumina having a particle size ranging from 0.5 to 0.95 μm or its precursor, said ceramic honeycomb support having a BET surface area ranging from 20 to 60 $m^2/g$.

2. The structured catalyst of claim 1, wherein said transition metal catalyst is an ICI catalyst.

3. The structured catalyst of claim 1, wherein said transition metal catalyst comprises 5 to 15 wt % of Mg based on the total weight of the transition metal catalyst, and at least two transition metals selected from the group consisting of Ni, Co, Fe, Mo, Cr, Ti and Zr.

4. The structured catalyst of claim 3, wherein said Ni ranges from 0.1 to 15 wt %, said Co ranges from 0.1 to 15 wt %, said Fe ranges from 2 to 15 wt %, said Mo ranges from 2 to 15 wt %, said Cr ranges from 0.1 to 1.0 wt %, said Ti ranges from 0 to 0.005 wt %, and said Zr ranges from 0 to 0.005 wt % based on the total weight of the transition metal catalyst.

* * * * *